United States Patent [19]

Fischer

[11] Patent Number: 4,806,752
[45] Date of Patent: Feb. 21, 1989

[54] INCREMENTAL OR ABSOLUTE ROTATION ENCODER WITH A CLAMPING DEVICE

[75] Inventor: Roland Fischer, St. Georgen, Fed. Rep. of Germany

[73] Assignee: Dr. Johannes Heidenhain GmbH

[21] Appl. No.: 125,321

[22] Filed: Nov. 25, 1987

[30] Foreign Application Priority Data

Dec. 10, 1986 [DE] Fed. Rep. of Germany ....... 3642230

[51] Int. Cl.$^4$ ............................................. G01D 5/34
[52] U.S. Cl. ............................................. 250/231 SE
[58] Field of Search ...................... 250/231 SE, 237 G; 340/347 P; 33/125 C; 356/375

[56] References Cited

U.S. PATENT DOCUMENTS

| | | | |
|---|---|---|---|
| 3,789,218 | 1/1974 | Blount | 250/231 SE |
| 4,386,270 | 5/1983 | Ezekiel | 250/231 SE |
| 4,652,746 | 3/1987 | Fenske et al. | 250/231 SE |

FOREIGN PATENT DOCUMENTS 3427709 7/1984 Fed. Rep. of Germany .

*Primary Examiner*—David C. Nelms
*Assistant Examiner*—Crystal Cooper
*Attorney, Agent, or Firm*—Toren, McGeady & Associates

[57] ABSTRACT

An incremental or absolute rotation encoder with a clamping device for connecting the encoder shaft to the drive shaft of a drive unit by means of a radial clamping action. A clamping element with a first sliding surface which is inclined relative to the axis of the encoder shaft is provided resting against a corresponding second inclined sliding surface at the end of the encoder shaft facing the connection with the drive shaft. An actuating element is capable of acting on the clamping element in axial direction. Since the two inclined surfaces rest slidingly on each other, the clamping element and the end of the encoder shaft are pressed in opposite radial directions against the drive shaft.

8 Claims, 2 Drawing Sheets

INCREMENTAL OR ABSOLUTE ROTATION ENCODER WITH A CLAMPING DEVICE

BACKGROUND OF THE INVENTION

1. Field of the Invention

The present invention relates to an incremental or absolute rotation encoder with a clamping device for connecting the encoder shaft to the drive shaft of a drive unit by means of a radial clamping action.

2. Description of the Prior Art

Incremental or absolute rotation encoders of this type are used particularly in processing machines for measuring the relative position of a tool relative to a workpiece to be worked on.

German Pat. No. 3,427,709 describes a rotation encoder with a clamping device for connecting the encoder shaft to the drive shaft of a drive unit. In this encoder, the encoder shaft is constructed as a tubular shaft which, at its end to be connected to the drive shaft, has a conical inner portion which defines a plurality of axial slots. This end of the encoder shaft with the conical portion engages in a coaxial bore of a connecting element which is fixedly coupled to the drive shaft of the drive unit. A pressing screw is inserted into the hollow encoder shaft from the rear side of the encoder. The pressing screw acts to spread apart the conical portion of the encoder shaft for effecting a frictional engagement of the encoder shaft with the connecting element. However, the hollow encoder shaft with the inner conical portion and the axial longitudinal slots is difficult to manufacture.

It is, therefore, the primary object of the present invention to provide a rotation encoder with a clamping device of simple construction for connecting the encoder shaft to the drive shaft of a drive unit.

SUMMARY OF THE INVENTION

In accordance with the present invention, a clamping element with a first sliding surface which is inclined relative to the axis of the encoder shaft is provided resting against a corresponding second inclined sliding surface at the end of the encoder shaft facing the connection with the drive shaft. An actuating element acting on the clamping element in axial direction presses, due to the two inclined sliding surfaces sliding on each other, the clamping element and the end of the encoder shaft in opposite radial directions against the drive shaft.

The particular advantage of the encoder according to the present invention resides in the fact that, by providing a clamping element with a first inclined sliding surface resting against a corresponding second inclined sliding surface of the encoder shaft and an actuating element in the form of a screw acting in axial direction on the clamping element, a clamping device is created which is of simple construction and easy to manufacture. In addition, this clamping device ensures a reliable, frictionally tight connection of the encoder shaft of the rotation encoder to the drive shaft of the drive unit.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 1b is a side view of the encoder shown in FIG. 1a;

FIG. 2b is a side view of the encoder shown in FIG. 2a.

DETAILED DESCRIPTION OF THE INVENTION

Figure 1A:
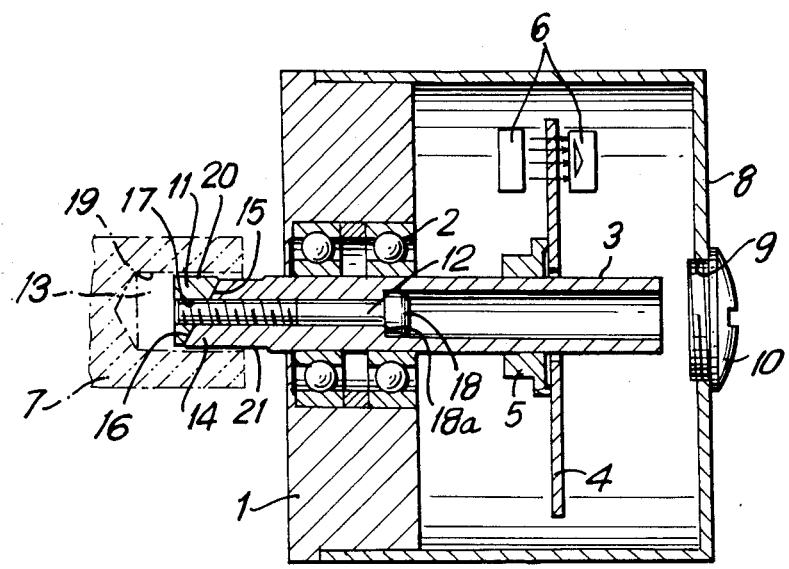
FIG. 1a is a sectional view in axial direction of a rotation encoder with a first embodiment of a clamping device.
Figure 1B:
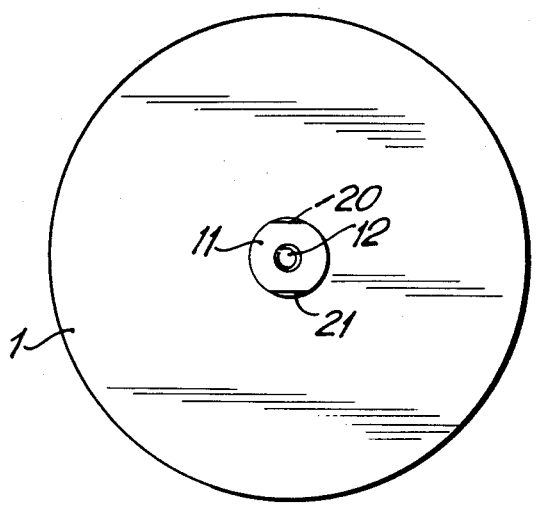

In FIG. 1a of the drawing, an incremental or absolute rotation encoder with a first embodiment of a clamping device is shown in axial cross-section and FIG. 1b shows a side view of this encoder.

The rotation encoder includes a stator 1 in which an encoder shaft 3 in the form of a continuous hollow shaft is supported by means of a double-row ball bearing 2. A graduation disk 4 with an angle graduation is mounted coaxially and rigidly by means of a connecting hub 5 on encoder shaft 3. The angle graduation is not shown in the drawing. The angle graduation of graduation disk 4 is scanned by means of a known scanning unit 6 mounted in the stator 1 for determining the relative angular position of a drive shaft 7 of a drive unit, not shown.

To provide protection for the graduation disk 4 and the scanning unit 6, a housing cover 8 is attached to the rear side of stator 1. Cover 8 has a bore 9 which is located coaxially with encoder shaft 3 and which can be closed by means of a closing cap 10. The front side of stator 1 is fastened to a mounting surface, not shown, of the drive unit.

A clamping device is provided for effecting a frictionally tight connection of the encoder shaft 3 of the encoder with the drive shaft 7 of the drive unit. The clamping device includes a clamping element 11 and an actuating element 12 in the form of a tension screw. The cylindrical clamping element 11 has the same diameter as the encoder shaft 3 and is inserted in a corresponding coaxial bore 13 of drive shaft 7. The end 14 of the encoder shaft 3 is also inserted in the bore 13 of drive shaft 7. Clamping element 11 has a first sliding surface 15 which is inclined relative to the axis of the encoder shaft 3. The first inclined sliding surface 15 rests slidingly against a corresponding second inclined sliding surface 16 of the end 14 of encoder shaft 3. After closing cap 10 is removed, the actuating element 12 in the form of a tension screw is inserted through bore 9 into the interior of the hollow encoder shaft 3 and, by means of an appropriate tool, not shown, is screwed into a coaxial internal thread 17 of clamping element 11. Head 18 of tension screw 12 rests against a contact surface 18a in the interior of hollow encoder shaft 3.

When the tension screw 12 acting on clamping element 11 is tightened in axial direction, the first inclined sliding surface 15 of clamping element 11 and the second inclined sliding surface 16 of encoder shaft 3 shift relative to each other, so that clamping element 11 and end 14 of encoder shaft 3 are pressed oppositely in radial direction against the inner surface 19 of bore 13 of encoder shaft 7 for a frictionally tight connection of the encoder shaft 3 with the drive shaft 7.

For improving the radial clamping action of the clamping element 11 and the end 14 of the encoder shaft 3, clamping element 11 has formed on its periphery an axially extending plane surface 20 and end 14 of encoder shaft 3 has formed on its periphery a plane surface 21. The two plane surfaces 20 and 21 are located diametrically opposite each other. The edges of the plane surfaces 20, 21 on the peripheries of the clamping element 11 and of the end 14 of encoder shaft 3 rest against inner surface 19 of bore 13 of drive shaft 7 in order to effect the clamping action.

Clamping element 11 is preferably manufactured by severing a piece along an inclined plane from the originally longer encoder shaft 3. After severing the piece from the encoder shaft 3, the first inclined sliding surface 15 of the clamping element 11 and the second inclined sliding surface 16 of the end 14 of the encoder shaft 3 are finished.

A coaxial bore is made in the portion of the hollow encoder shaft 3 which later receives the tension screw 12 and in the clamping element still connected to the encoder shaft 3. The coaxial bore is required for subsequently preparing an internal thread 17 of the clamping element 11 still to be severed. After the clamping element 11 has been severed from the encoder shaft 3, the internal thread 17 is prepared in the clamping element and the bore in the interior 16 of the hollow encoder shaft 3 receiving the tension screw 12 is increased to such a diameter that the shaft of tension screw 12 does not have any contact with the inner wall of this bore in the tensioned state.

Figure 2A:
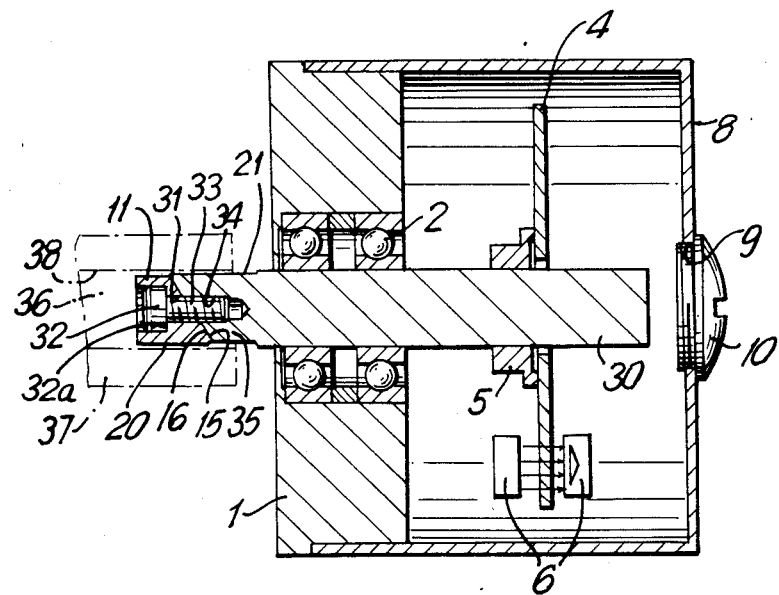
FIG. 2a is a sectional view of axial direction of a rotation encoder with a second embodiment of a clamping device.
Figure 2B:
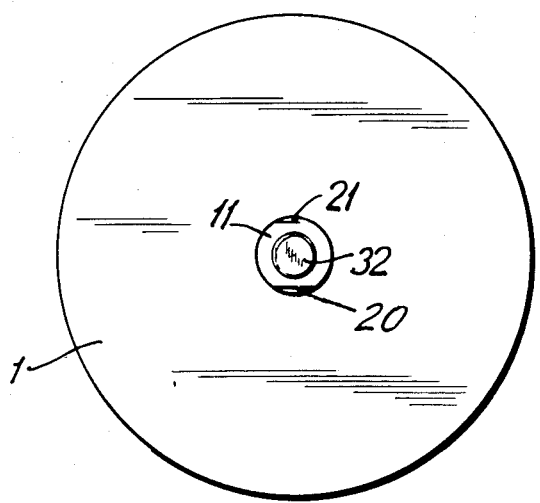

FIG. 2a of the drawing is an axial cross-sectional view of an incremental or absolute rotation encoder with a second clamping device. FIG. 2b shows this encoder in a side view.

Those elements of the encoder shown in FIG. 2a which correspond to elements shown in FIGS. 1a and 1b have the same reference numerals and are not further described below.

In contrast to the encoder shown in FIGS. 1a and 1b, the encoder shown in FIGS. 2a and 2b has a solid encoder shaft 30. Clamping element 11 rests with its first inclined sliding surface 15 against the second inclined sliding surface 16 of encoder shaft 30. Clamping element 11 has a coaxial bore 31 and, at its free end, clamping element 11 has a contact surface 32a. A head 32 of an actuating element 33 in the form of a tension screw rests against contact surface 32a. Actuating element 33 engages in an internal thread 34 in the end 35 of encoder shaft 30. Encoder shaft 30 including clamping element 11 is inserted into a corresponding continuous bore 36 with an inner surface 38 of a drive shaft 37 of a drive unit, not shown.

For effecting a radial clamping action of the clamping element 11 and the end 35 of the encoder shaft 30, tension screw 33 is tightened by means of an appropriate tool, not shown, from the side of the drive unit through the continuous bore 36 of drive shaft 37.

While specific embodiments of the invention have been shown and described in detail to illustrate the application of the inventive principles, it will be understood that the invention may be embodied otherwise without departing from such principles.

I claim:

1. A rotation encoder with a clamping device for connecting a encoder shaft for rotation with a drive shaft of a drive unit by means of radial clamping action of the clamping device, the encoder shaft having an axis and an end facing the connection with the drive shaft, the clamping surface extending inclined relative to the axis of the encoder shaft, the end of the encoder shaft defining a corresponding second inclined sliding surface, wherein the first and second sliding surfaces rest slidingly against each other, an actuating element capable of acting on the clamping element in axial direction, so that the clamping element and the end of the encoder shaft are moved radially in opposite directions and the clamping element and the end of the encoder shaft are pressed against the drive shaft.

2. The encoder according to claim 1, wherein the encoder is an incremental encoder.

3. The encoder according to claim 1, wherein the encoder is an absolute encoder.

4. The encoder according to claim 1, wherein the encoder shaft is an axially continuous hollow shaft, the hollow shaft defining an interior space, the interior space defining a contact surface, the actuating element being a tension screw including a head, the head of the tension screw resting against the contact surface in the interior space of the encoder shaft, the clamping element defining an internal thread, the tension screw engaging in the internal thread, the drive shaft defining a bore with an inner surface, the clamping element and the end of the encoder shaft being pressed against the inner surface of the bore when the tension screw acts on the clamping element in axial direction.

5. The encoder according to claim 1, wherein the encoder shaft is a solid shaft, the clamping element having a free end with a contact surface, the actuating element being a tension screw including a head, the head of the tension screw resting against the contact surface, the clamping element defining a bore and the end of the encoder shaft defining an internal thread, the tension screw extending through the bore in the clamping element and engaging the internal thread of the end of the encoder shaft, the drive shaft having a continuous bore with an inner surface, the clamping element and the end of the encoder shaft being pressed radially against the inner surface of the bore of the drive shaft when the tension screw acts on the clamping element in axial direction.

6. The encoder according to claim 1, wherein the clamping element defines an axially extending plane surface on its outer periphery.

7. The encoder according to claim 1, wherein the end of the encoder shaft defines an axially extending plane surface on its outer periphery.

8. The encoder according to claim 1, wherein the clamping element is a portion of the encoder shaft severed along an inclined plane.

* * * * *